April 5, 1960

J. P. THOME 2,931,888

WELDING

Filed March 8, 1957

INVENTOR
JOSEPH P. THOME

BY Scrivener & Parker

ATTORNEYS

United States Patent Office 2,931,888
Patented Apr. 5, 1960

2,931,888
WELDING

Joseph P. Thome, Elyria, Ohio, assignor to Bendix-Westinghouse Automotive Air Brake Company, Elyria, Ohio, a corporation of Delaware Application March 8, 1957, Serial No. 644,867

4 Claims. (Cl. 219—107)

This invention relates to a method of uniting one metallic element to another and more particularly to an improved method of attaching ferrules, grommets, spuds, studs, and clinch nuts or the like in strong, homogeneous and pressure-tight relationship to metal plates by the resistance welding process.

One of the principal objects of the invention is to provide an improved method for attaching, by electrical welding, a ferrule or the like to an apertured plate with the provision of means for preventing fused metal from entering or otherwise obstructing the passages in the ferrule and plate.

A further object of the invention is to accomplish the above method, in part, by providing a pilot plug or guide member of slightly less diameter than the apertures and which facilitates the location of the apertured plate with respect to one of the electrodes and which also facilitates the location of the ferrule concentrically with the aperture in the plate while at the same time acting as a shield to prevent fused metal from entering and restricting the passages or apertures in the ferrule and plate.

A still further object of the invention is the provision of an improved electric welding process for joining a ferrule to a plate wherein: line contact is provided between the plate and ferrule to concentrate electrical energy and heat; the electrodes can be positively located in optimum welding position without upsetting the metal in any way; and space is provided between the ferrule and the metal plate into which molten metal may flow without any possibility of entering the passages through the ferrule and plate.

Figure 1:
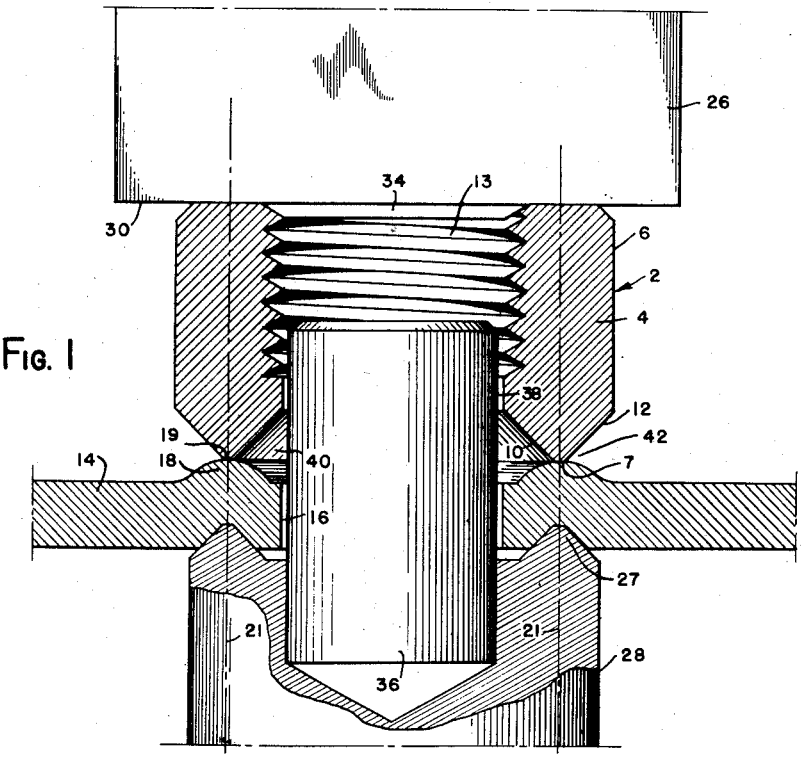
Figure 2:
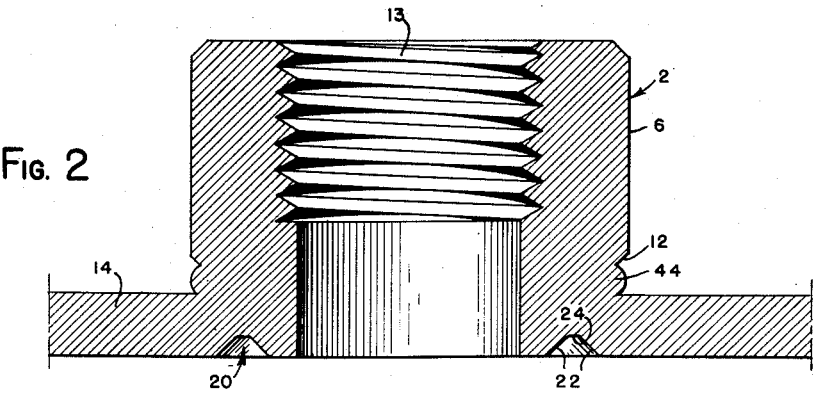

Other objects and their attendant advantages will become apparent as the following detailed description of the invention is read in conjunction with the accompanying drawings wherein:

Fig. 1 is a vertical cross-section through a ferrule and metal plate as assembled preparatory to the formation of the welded joint; and Fig. 2 is a vertical cross-section showing the members of Fig. 1 joined together in accordance with the invention.

Referring to the drawings, there is illustrated a ferrule 2 having a body portion 4 which may be of any desired form but which is shown as being cylindrical and provided with an exterior wall 6, the annular lower end 7 of which is formed by the sloping conical portions 10 and 12. An axial threaded bore 13 extends through the ferrule 2.

A plate 14, to which the ferrule is to be attached, is provided with an aperture 16. Formed around the aperture 16 is an annular, rounded ridge 18 having an arcuate crest 19 adapted to be engaged by the annular lower end 7 of the ferrule 2. As shown, the ridge is preferably convex in cross-section. Below the ridge 18 an annular recess 20 is formed, preferably having upwardly converging side walls 22 and a flat upper wall 24 so that in cross-section, the shape of the recess may be that of a frustum of a triangle for purposes to be described. It should be noted that the recess 20 and the ridge 18 may be formed in a single pressing operation which results in a uniform metal thickness and a uniform ridge height between the wall 24 and the crest 19. The aperture 16 may thereafter be punched in a separate die which utilizes the recess 20 as a locating means to insure accurate concentricity of the former with the latter.

For welding the ferrule and plate together, upper and lower electrodes 26 and 28 are provided with the upper end 27 of the lower electrode being shaped so as to be complementary with the annular recess 20 whereby the electrode and the plate may be mated in optimum welding position. The upper electrode 26 has a flat end portion 30 for engagement with the top of the ferrule 2 and is preferably provided with a depending pilot portion 34, slightly smaller in diameter than the threaded bore 13, for locating the electrode relative to the ferrule.

One of the features of the present invention resides in a novel means and method for facilitating the assembly of the plate 14 and ferrule 2 prior to the welding operation. As shown, a pilot plug 36 of stainless steel is carried by the electrode 28, the same being pressed into a suitable aperture in said electrode so as to be in concentric relationship with the annular upper end 27 of the electrode. The aperture 16 in the plate 14 is concentric with the recess 20 and is but slightly larger in diameter than the pilot plug 36. The upper end of the plug 36 extends partly into the interior of the ferrule 2, when the parts are assembled as shown in Fig. 1, and the aperture 38 at the lower end of the ferrule is concentric with the lower annular end 7 of the ferrule and is but slightly larger in diameter than the pilot plug 36. For purposes of illustration, the clearances between the ferrule and the pilot plug and between the latter and the plate at the apertures 16 and 38 have been exaggerated. With such an arrangement the location of the end 7 of the ferrule 2 centrally on the crest 19 is readily and quickly effected during initial assembly of the parts, thus insuring alignment of the ferrule and continuous line contact between the latter, the plate 14, and the lower electrode 28 as indicated by the dotted lines 21.

With the plate and ferrule constructed as above described and with these members assembled as shown in Fig. 1, a space 40 for the reception of molten metal is provided between the crest 19 of ridge 18 and the outer surface of the pilot plug 36. Furthermore, outwardly of crest 19 and between the conical portion 12 and the ridge 18 there is provided a space 42 for the reception of additional molten metal. The aforementioned slight clearance between the plug 36 and the aperture 16 is sufficiently small to prevent the molten metal in space 40 from flowing down around the plug 36 into the aperture 16 but nevertheless is large enough to permit the escape of air and gases, thereby eliminating voids in the metal trapped in the space 40. In like manner, the clearance between the plug 36 and the aperture 38 is relatively slight so that after the ferrule 2 is slipped over the plug and occupies the position shown in Fig. 1, the pilot portion 34 will always enter the upper end of the bore 13 and center the ferrule as shown. Hence it will be understood that with the construction provided, the line contact of the electrode 28, the recess 20, crest 19 and end portion 7 along the lines 21 will be assured and that there will be no tendency for the ferrule to become cocked prior to welding. It will also be understood that the aforementioned slight clearance between the plug 36 and the aperture 38 is such that no fused metal will enter the aperture 38 during the welding operation. Also, with the described arrangement a continuous path is provided for the transmission of welding current with a resultant uniform and concentrated heating of the metal.

In performing the invention, the ferrule is provided with the described conical lower end portion 7, and the ridge 18 and recess 20 are formed in the plate 14 in a single conventional pressing operation. Thereafter the aperture 16 is punched using the recess 20 as a guide to insure concentricity of the aperture and ridge and the pilot plug is then pressed into the lower electrode 28 preparatory to welding.

The parts are then assembled, as indicated in Fig. 1, the shaped portion 27 of the lower electrode 28 being received in the recess 20, and the pilot portion 34 of the upper electrode 26 entering the upper portion of the bore 13 and centering the ferrule 2 as shown. When welding current, in combination with an axial closing force, is applied to the electrodes, an immediate concentrated intense heat results at the line of contact between the end 7 of the ferrule 2 with the ridge crest 19 which is the path of least resistance for the welding current. When the metal is heated to melting temperature, molten metal flows downwardly from the ridge crest, filling, on the inner side thereof and around the plug 36, the space 40, with excess metal flowing downwardly and outwardly into the space 42 beneath the conical portion 12 of the ferrule, thus forming an annular bead 44 as shown in Fig. 2. Upon completion of the welding operation it will be observed in Fig. 2 that the ferrule is embedded in the metal plate by a solid homogeneous mass of metal equal approximately in height to the annular ridge 18. The metal which flows outwardly to form the bead 40 extends the bonding area for maximum weld strength and the bead also produces a neat appearance. It will be understood that since the plug 36 is made of stainless steel and is hence a non-conductor, no metal will adhere thereto during the welding operation and that after the latter is completed, the welded parts may be readily removed from the electrode 28.

Several important features of the invention should be particularly noted. One resides in the use of the recess 20 and the shaped electrode 28 which permits optimum contact area therebetween while preventing the metal from being upset into the passage 16 through the plate and ferrule when welding pressures are applied to the electrodes. Another important feature resides in the arrangement of the conical end portion 7 for line contact with the crest 19 of ridge 18. This arrangement permits maximum concentration of heat with a minimum of welding pressure on the electrodes. A further feature of the invention resides in the combination of a locating pilot and a shield provided by the plug 36. This member prevents any molten metal from flowing into the passages 16 and 38 while at the same time the slight clearances between the pilot and the apertures 16 and 38 insure accurate location of the parts 2 and 14 without any tendency for coking of the ferrule, as well as providing escape means for any gas or air that might otherwise accumulate in the space 40.

It will, of course, be apparent that the invention described herein is susceptible of various modifications and changes, without, however, departing from the scope of the appended claims.

What is claimed is:

1. The method of welding a hollow body member in pressure-tight relationship to an apertured plate by means of an upper and a lower electrode, provided with a pilot plug of substantially non-conducting material comprising forming said body member with inner and outer converging shoulders to form a continuous annular conical end portion, forming an annular ridge about the aperture in the plate having a continuous rounded crest positioned for continuous annular line contact with said conical end portion of the body member, assembling the plate on the lower electrode and the body member on the plate with the pilot plug projecting through the plate aperture and into the body member and with said conical end portion in continuous annular line contact with the crest of said ridge, the inner shoulder, ridge and plug forming a space for the reception of molten metal and the outer shoulder and the ridge outwardly of said space forming an annular recess for the reception of molten metal, moving the upper electrode into contact with the body member to force the conical end portion of the latter into continuous annular line contact with the crest of said ridge, and applying a welding current to said electrodes to produce a continuous annular joint between the body member and plate.

2. The method in accordance with claim 1 which includes in addition, forming an annular recess congruently beneath said ridge for engagement by the lower electrode shaped complementary with said annular recess.

3. The method in accordance with claim 2 wherein said plug is formed with a diameter slightly less than that of said aperture to provide a clearance sufficiently small to prevent the flow of molten metal therethrough but sufficiently large to permit the passage of gas and air in said space.

4. The method according to claim 3 wherein the plug is formed with a diameter slightly less than the internal diameter of the body member and the upper electrode is formed with a depending pilot portion for entering the bore of the body member to center the latter with respect to the crest of said ridge.

References Cited in the file of this patent
UNITED STATES PATENTS

| | | |
|---|---|---|
| 394,892 | Thomson | Dec. 18, 1888 |
| 1,215,965 | Murray | Feb. 13, 1917 |
| 1,489,640 | Jacocks | Apr. 8, 1924 |
| 1,739,691 | Pierson | Dec. 17, 1929 |
| 2,127,685 | Greulich | Aug. 23, 1938 |
| 2,167,285 | Smith | July 25, 1939 |
| 2,355,444 | Kenny | Aug. 8, 1944 |
| 2,387,905 | Hoch | Oct. 30, 1945 |
| 2,477,430 | Swanstrom | July 26, 1949 |
| 2,623,974 | Frucha | Dec. 30, 1952 |